United States Patent [19]

Takada, deceased

[11] 3,915,401

[45] Oct. 28, 1975

[54] INERTIA-RESPONSIVE AUTOMATIC BRAKING SAFETY BELT RETRACTOR

[75] Inventor: Takezo Takada, deceased, late of Tokyo, Japan, by Juichiro Takada, legal heir

[73] Assignee: Takata Kojyo Co., Ltd., Tokyo, Japan

[22] Filed: Jan. 17, 1974

[21] Appl. No.: 434,323

[30] Foreign Application Priority Data
Jan. 19, 1973 Japan............................ 48-8387[U]
Jan. 20, 1973 Japan............................ 48-8777[U]

[52] U.S. Cl. ........................................... 242/107.4
[51] Int. Cl. ......................................... B65H 75/48
[58] Field of Search............ 242/107.4, 107.3, 107.6, 242/107 SB; 297/388; 280/150 SB

[56] References Cited
UNITED STATES PATENTS
| | | | |
|---|---|---|---|
| 2,708,966 | 5/1955 | Davis | 242/107 SB |
| 2,883,123 | 4/1959 | Finnigan | 242/107.4 |
| 3,578,260 | 5/1971 | Kell | 242/107.4 |
| 3,610,361 | 10/1971 | Pringle | 242/107.4 |
| 3,797,603 | 3/1974 | Loomba | 242/107.4 |

*Primary Examiner*—Edward J. McCarthy
*Attorney, Agent, or Firm*—Wolder & Gross

[57] ABSTRACT

An automatic braking safety belt retractor includes a spring biased belt rewind reel, having a ratchet wheel and a pawl member swingable between ratchet engage and disengage positions. A control station is located remotely from the retractor and includes an inertia device responsive drive member coupled by a flexible cable slideable through a tubular sheath extending between the retractor and control station to the pawl member so that actuation of the inertia device effects the pawl engagement of the ratchet wheel. In one form the drive member includes an armature motivated by a solenoid which is energized by the actuation of an inertia switch. In another form the inertia device includes a universally swingable pendulum, and a member following the pendulum movement and coupled to the flexible cable.

9 Claims, 7 Drawing Figures

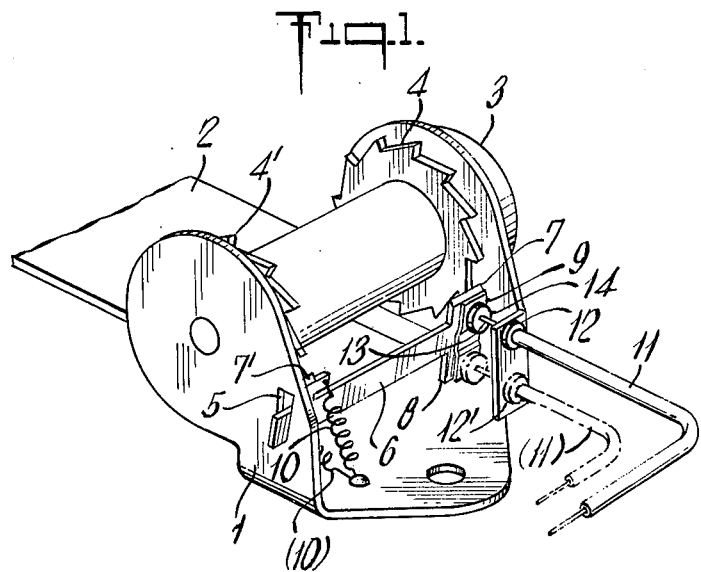
Fig.1.
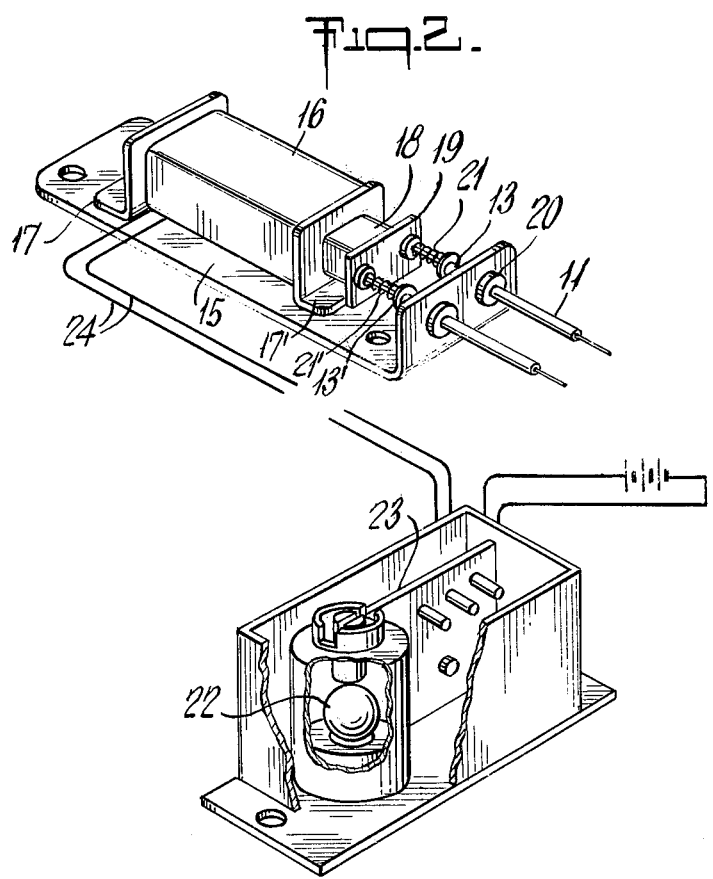
Fig.2.
Fig.3.

INERTIA-RESPONSIVE AUTOMATIC BRAKING SAFETY BELT RETRACTOR

BACKGROUND OF THE INVENTION

The present invention relates generally to improvements in vehicle safety belt systems, and it relates particularly to an improved automatic braking belt retractor mechanism.

It is a common practice in vehicle safety belt systems to rewind the safety belt onto spring biased retractors which permits the withdrawal of the belt, except under abnormal conditions, such as a sharp change in the velocity of the vehicle, or in the event of an excessive vehicle inclination. A mechanism widely employed to lock the reel against belt withdrawal in the event of an accident includes an inertia switch or other inertia actuated sensing unit which actuates the reel brake, usually a pawl and ratchet assembly, when the sensing unit detects an abnormal vehicle movement or position. While the functioning of these mechanisms is highly desirable, the mechanisms heretofore proposed or available possess important drawbacks and disadvantages. Among these is the great space rerequired for the positioning and mounting of the retractor unit by reason of its bulk and complexity, thereby seriously limiting its application, versatility and adaptability, and providing only difficult access thereto for mounting, repair and servicing. These disadvantages are particularly evident as related to compact cars where space is greatly limited.

SUMMARY OF THE INVENTION

It is a principal object of the present invention to provide an improved vehicle safety belt system.

Another object of the present invention is to provide an improved vehicle safety belt system of the automatic braking belt retractor type.

Still another object of the present invention is to provide an improved automatic braking retractor reel, which is actuated by an inertia responsive mechanism.

A further object of the present invention is to provide an inertia responsive automatic braking belt retractor system capable of installation and access in confined and limited spaces.

Still a further object of the present invention is to provide a mechanism of the above nature characterized by its high reliability, ruggedness, compactness, simplicity and great versatility and adaptability.

The above and other objects of the present invention will become apparent from a reading of the following description taken in conjunction with the accompanying drawings, which illustrate preferred embodiments thereof.

In a sense, the present invention contemplates the provision of a safety belt retractor mechanism comprising a retractor unit, including a spring biased belt rewind retractor reel, a brake member movable between lock and release positions respectively, locking and releasing the reel for belt withdrawal, a control station positioned remotely from the retractor unit and including an inertia responsive sensing member movable between actuated and deactuated positions, and a drive member movable between advanced and retracted positions with the actuation and deactuation of the sensing member, a tubular sheath extending between the retractor unit and control station, and a flexible cable slideably extending through the sheath and drive coupling, the drive and brake members, whereby the cable is advanced and retracted with the drive member to urge the brake member to its lock and release positions. The brake is advantageously a rockable pawl member which is movable into separable engagement with a ratchet wheel rotatable with the reel.

In one form the drive member is the armature of a solenoid which is connected to a current source through an inertia switch and is connected by way of a pair of sheathed flexible cables to the pawl member at opposite sides of its axis of rotation. In another form the sensing member is a universally swingable pendulum which engages and effects the advance and retraction of a follower member which is drive coupled to the brake actuating cable, so that swinging of the pendulum a predetermined angle effects the braking of the reel. The last form possesses the advantage of being completely mechanical and obviating the need for electrical networks. In both forms the retractor unit is highly compact and is simply installed in small and confined spaces, and the systems are rugged, simple, highly reliable and of great versatility and adaptability.

BRIEF DESCRIPTION OF THE DRAWINGS

FIG. 1 is a perspective view of the retractor unit of a first embodiment of the present invention;

FIG. 2 is a perspective view of the brake drive mechanism thereof;

FIG. 3 is a perspective view of the sensing unit thereof;

DESCRIPTION OF THE PREFERRED EMBODIMENTS

Figure 4:
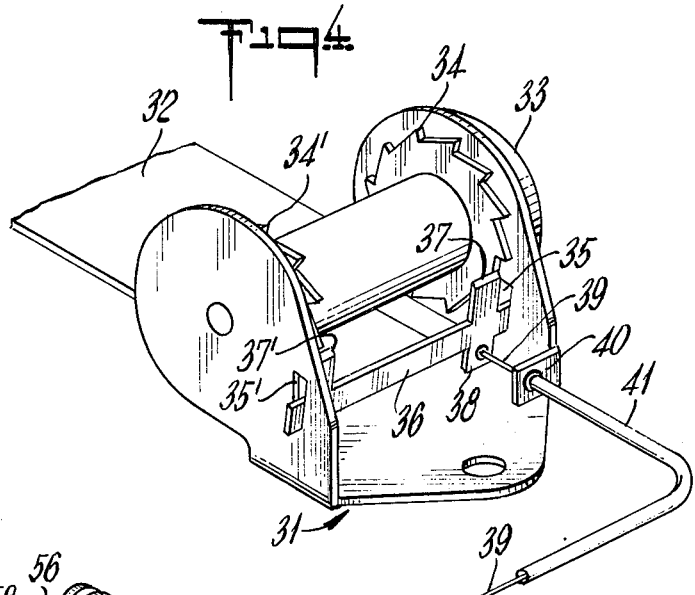
FIG. 4 is a perspective of the retractor unit of another embodiment of the present invention.

Referring now to the drawings, particularly FIGS. 1 to 3 thereof, which illustrate a preferred embodiment of the present invention as applied to a current on-lock system in which reel braking is effected upon the energization of a solenoid, while the belt retracting mechanism may be of conventional construction, the illustrated winding means includes a U-shaped frame or bracket 1 which is secured to the vehicle floor or the lower seat portion. There is provided a belt winding reel rotatably mounted between the side wall portions of the winding frame 1. The reel holds one end of the lap belt 2 and is biased to retractably wind a lap belt 2 under the force of a housed spiral spring 3, the both side plates of the reel being formed as wheel ratchets 4, 4'. There is also provided a pawl member 6 which is mounted to the winding frame 1 by engagement with opposing pawl holes 5 formed in the side walls of the winding frame 1. Pawl member 6 has pawl teeth 7, 7' and is movable within a certain range so that the teeth 7, 7' may be engaged with and disengaged from the ratchets 4, 4'. A flat depending projection 8 is provided at the lower portion of one of teeth 7. The configuration and the load point of the flat projection 8 are so selected, for example, that the distance between the fulcrum or axis of the pawl member 6 and the load point of the tooth 7 is made equal to the distance between the fulcrum of the pawl member 6 and the load point of the projection 8, for equalizing the control wire displacement. To the pawl 7 and the projection 8 is centrally secured a common thrust leaf spring 9, such as by riveting. Small gaps are provided between the load point of the thrust spring 9 and the pawl 7 and the flat projection 8. To the bottom inside face of the winding frame 1, or to any other suitable place, there is mounted a helical return spring 10 in such manner that the engaging position thereof with the pawl plate 6 may be changed, as desired, to the upper or the lower position. The spring 10 is normally kept in its upper engagement position so that the pawl member 6 is resiliently urged to disengagement from the ratchets 4, 4'. An upper tube mounting portion 12 and a lower tube mounting portion 12' are formed as by bending a side wall portion of the winding frame 1, and a tube 11 is secured to the upper tube mounting portion. A flexible wire 13 slideably extends through the tube 11. To the end part of the wire 13 and intermediate the upper tube mounting portion 12 and the upper part of the thrust spring 9 is secured a pawl actuating plate or head 14 made of a synthetic resin or metal. The tube 11 is formed of a soft synthetic resin material or a steel wire helically wound into a coil and the wire 13 is made of, for example, twisted or straight steel wire or resin wire.

As seen in FIG. 2, an electro-magnetic means has a mounting plate in the form of a flat plate or a box for mounting of the unit to the vehicle floor, vehicle wall, seat wall or to any other suitable place inside the vehicle. A solenoid 16 capable of developing the required thrust force is secured to the plate as with small screws through the medium of solenoid mounting frames 17, 17'. A plunger armature 18 is slideably mounted in the solenoid 16, and a wire mounting plate 19 made of synthetic resin, brass or other magnetically insulating material is secured to the projected end of the plunger as with screws or by welding. One or a pair of wires, 13, 13' . . . are secured to the mounting plate 19 as with cap screws or by any other suitable means. A tube mounting plate 20 is formed as by bending one end wall portion of the mounting plate 15, and a wire 13 coupled to the winding unit and a wire 13' coupled to another winding unit are secured to tube mounting plate 20. Compression springs 21, 21' . . . are provided around the wires 13, 13', and are entrapped between the tube mounting plate 20 and the wire mounting plate 19 so that the wires 13, 13' will perform the same movement as the plunger 18 together with wire mounting plate 19. The armature plunger 18 is furthest from the tube mounting plate 20 when the solenoid 16 is deenergized and pushes the wire forward when the solenoid is energized.

An example of an acceleration sensor or inertia switch and network is shown in FIG. 3, and is of known construction and mounted horizontally on the vehicle floor or other suitable location. The sensor is connected through leads 24 to the electromagnetic unit shown in FIG. 2 and has a steel ball 22 for sensing the acceleration and deceleration of the vehicle at the occurrence of abnormal situations of the vehicle and includes an electrical control unit 23. The steel ball 22 is mounted on a pedestal in the well-known manner, and upon abnormal movement moves off the pedestal into contact with the side wall, completing the electrical circuit within the control unit 23. The control unit 23 has a delay means and is adaptable to either on-lock or off-lock by exchange of certain electrical components and connections thereof.

The operation of the above system, the control network 23 is enclosed in the sensor shown in FIG. 3 and is adapted for on-lock and the sensor circuit is closed by the closing of the inertia switch by operation of the steel ball 22 at the occurrence of unusual situations of the vehicle, so that current passes through the conductor 24 for several seconds by operation of delay means. The solenoid 16 is therefore energized, and the plunger 18 pushes the wires 13, 13' . . ., the teeth 7, 7' of pawl member 6 thus meshing with the ratchets 4, 4' through the actuating plate 14 and the upper portion of thrust spring 9, thus establishing the emergency lock of the on-lock system. When the solenoid 16 is subsequently deenergized, the movable parts are all returned to their starting position, under the spring force of the compression spring 21. It will be apparent that, when several winding units are provided, these units will perform in the same manner.

A second or off-lock system, in which reel locking is performed upon the opening of the solenoid circuit, differs from the above described on-lock system in that the component parts of the control unit are exchanged by those for off-lock operation system, the tube 11 which was mounted to the upper mounting portion 12 is now mounted to the lower mounting position 12', and the return spring 10 which was hooked in the upper position is hooked in the lower position. In operation, the current is passed through the control unit 23 when the passenger takes his seat. The solenoid 16 is energized and the plunger 18 thus projected outwards, so that the teeth 7, 7' of the pawl plate 6 are disengaged from the ratchets 4, 4' through the actuating plate 14 and the lower portion of the thrust spring 9. This state is maintained during the driving time. In case of some unusual situation, the sensor circuit is closed by operation of the steel ball 22 and the control unit 23. As the solenoid 16 is now energized, the wires 13, 13' are retracted under spring force of the compression spring 21, 21', and the return spring 10 pulls the lower point of the pawl member 6. The emergency lock of the off-lock system is completed with the pawl teeth 7, 7' engaging the ratchets 4, 4'. Thereafter, as the operation of the delay means provided in the control unit 23 closes, the sensor unit is again turned on and the teeth 7, 7' are disengaged from the ratchets 4, 4', all the moving parts being then returned to their starting positions. Several winding units, when mounted, will come into operation simultaneously, as in the case of the on-lock operation.

The available mounting space for the retractor unit is very limited in many kinds of the vehicles, while the vehicle space other than the mounting space for the retractor unit is plentiful, as for example, inside the vehicle trunk. Therefore, the retractor unit may be extremely compact by elimination of almost all the lock mechanism components, thus enabling the mechanism to be very easily applied. In addition, the on-lock system may be changed easily to the off-lock or vice versa and several retractor units may be actuated by one control station.

Figure 5:
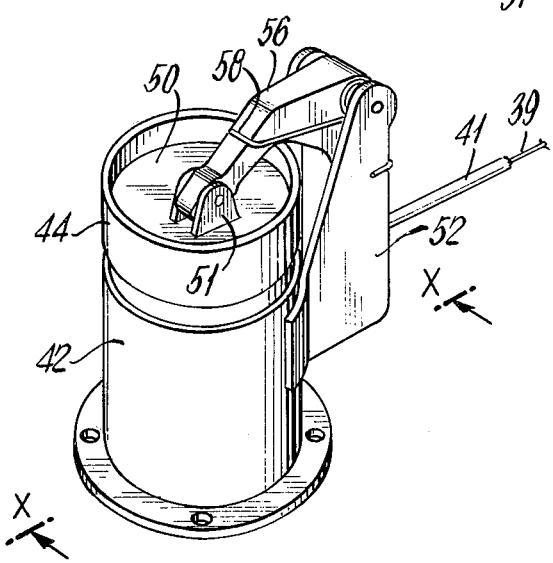
FIG. 5 is a perspective view of the brake control unit thereof.
Figure 6:
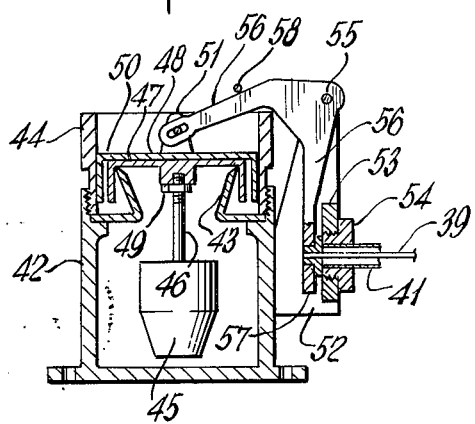
FIG. 6 is a sectional view taken along line X—X in FIG. 5.
Figure 7:
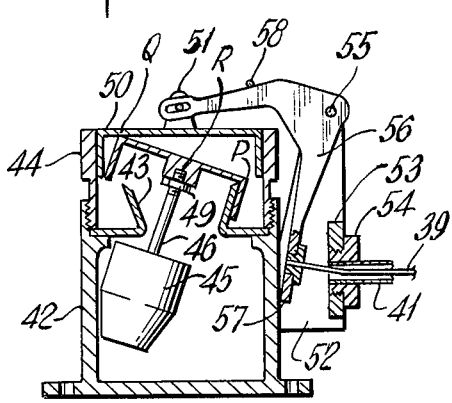
FIG. 7 is a view similar to FIG. 6 showing the inertia sensing member in an actuated position.

Referring now to FIGS. 4 to 7 which illustrate another embodiment of the present invention in which the retractor unit or the winding means is similar to that first described and mounted to the vehicle floor or to the lower seat portion and includes a U-shaped bracket or winding frame 31. A retractor reel or spool is rotatably mounted between the side wall portions of the winding frame 31 and engages a lap belt 32, which may be retracted under the force of a spiral spring 33 or the like, the both side plates of the spool being in the form of ratchets 34, 34'. There is also provided a pawl member 36 which is journalled in pawl holes 35, 35' formed in both side wall portions of the winding frame 31. The pawl member 36 has pawl teeth 37, 37' and is swingable within a predetermined angle so that pawl teeth 37, 37' and ratchets 34, 34' may be engaged with or disengaged from each other. A flat projection 38 is formed to depend from the pawl tooth 37 and the one end part of a flexible wire 39, consisting of a twisted steel wire, is secured thereto with a set nut or the like. A tube mounting portion 40 is formed by bending one side wall of the U-shaped winding frame 31, and a tube 41, consisting, for example, of a pipe of soft resin, with the wire 39 slideably extending therethrough, is secured thereto as with a tightening screw. The sensor unit includes a lower casing 42 which is secured to the vehicle floor at a suitable height. A fulcrum defining outwardly, upwardly tapered ring, having an annular flange is located within the casing and is secured in position by screwing an upper cap shaped plug 44 into the female threaded portion of the lower casing 42. The shank or arm end 46 of a pendulum 45 is screwed to an inner center boss 48 of a bonnet-shaped displacement member 47 and secured with a set nut 49 after the arm has been adjusted to the desired length. Thus, the displacement member 47 is placed with its inside resting on the circular fulcrum defined by the bevelled upper periphery of the ring 43. A bonnet-shaped slide plate follower or piston 50 is mounted to rest on the displacement member 47 so as to slide along the inner cylindrical surface of the upper casing 44. A metal pivot pin 51 is mounted on the upper central position of the top face of the follower piston 50. A U-shaped bracket 52 is secured to the outside face of lower casing 42 with rivets or other fastening means. The bottom cross-web of the bracket 52 is used as a tube mounting portion 53, to which the tube 41 is mounted as with a tightening screw 54. A shaft 55 is mounted at the upper portion of the bracket 52 and passes through a central hole at the elbow of an L-shaped lever or bell crank 56. The upper end of the lever 56 has an elongated slot which is engaged by the pivot pin 51 carried by the follower 50, while the other end is located within the arms of the U-shaped bracket 52 and defines a wire mounting portion 57 to which the corresponding end of the wire 39 is secured, as with set nuts. A hairpin spring 58 loosely engages the lever 56 to urge the follower 50 to its lowermost position and hence, fully extend the wire 39 and thereby disengaging the pawl teeth 37, 37' from the ratchets 4, 4'. The resilient force of the spring 58 is slightly larger than the overall frictional force including the friction existing between the tube 41 and the wire 39. In case of an unusual situation of the vehicle, the meshing of the teeth 37, 37' with the ratchets 34, 34' may be restored to the normal state after a short interval of, e.g., seconds.

The pendulum of the sensor is of the type in which the fulcrum point of the pendulum is shaped in a manner that a greater pendulum reaction occurs at a predetermined acceleration or deceleration to make the volume of the acceleration sensor small relative to the acceleration and deceleration applied to the pendulum weight. In operation, when the pendulum senses an unusual condition of the vehicle, the end part of the displacement member 47 is raised with a point P on the circumference of the cap 43 as a fulcrum and the uppermost point Q lifts the follower piston 50. The bell crank 56 is rocked slightly about the shaft 55 by the rising of the pivot pin 51 with the follower 50. The wire mounting portion 57, situated on the lower end part of the lever 56, thus effects a left and right movement, to correspondingly shift the wires 39 the same extent as that of the follower 50. The projection 38 on the pawl member is simultaneously pulled and the pawl member 36 operates so that the pawl teeth 37, 37' are urged to engage the ratchets 34, 34' thereby completing the emergency locking. When the pendulum 45 is restored, the spring 58 overcomes the frictional forces and the lever 56 is returned to its former position. Therefore, the follower 50, the wire 39, pawl member 36, etc., are gradually returned to their initial positions, and the pawl teeth 37, 37' are disengaged from the ratchets 34, 34' after a short delay of, for example, 20 seconds, the movable components being thus returned to the normal running condition.

In the pendulum system, the necessary displacement of the wire is determined by such factors as the fulcrum position of the pawl member 6, the mounting position of the wire 39 to the projection 38, the difference in the lengths of the two arms of the lever 56 and so forth. If this displacement may be small, the pivot pin 21 may be positioned on the central point R of the displacement member 47 for direct actuation of the lever. It may also be noted that the angle of deflection of the pendulum may be enhanced and the fulcrum of the pendulum may have the shape of a hemiphere or inverted cone, with increased volume, so that the displacement of the wire 39 may be initiated at a smaller movement of the pendulum.

While there have been described and illustrated preferred embodiments of the present invention, it is apparent that numerous alterations, omissions and additions may be made without departing from the spirit thereof.

I claim:

1. A safety belt retractor braking mechanism comprising a retractor unit including a spring biased belt rewind retractor reel, a brake member movable between lock and release positions respectively, locking said reel against belt withdrawal and releasing said reel, a control station positioned remotely from said retractor unit and including an inertia responsive sensing member movable between an actuated and a deactuated position and a drive member movable between advanced and retracted positions in response respectively to the actuated and deactuated positions of said sensing member, a tubular sheath extending between said retractor unit and said control station, and a flexible cable slideably extending through said sheath with its opposite ends drive associated with said brake member and said drive member whereby said cable is advanced and retracted with the advance and retraction of said drive member and said brake member is movable to lock and release positions with the advance and retraction of said cable respectively.

2. The mechanism of claim 1 wherein said retractor reel includes a ratchet wheel coaxial and rotatable with said reel and said brake member comprises a pawl member rockable about a predetermined axis into lock position engaging said ratchet wheel and a release position disengaged from said ratchet wheel.

3. The mechanism of claim 2 wherein said drive member includes a solenoid actuated armature and comprising an inertia switch including a switch actuating element defining said inertia sensing member and a solenoid energized in response to the actuation of said switch to motivate said drive member.

4. The mechanism of claim 2 including a pair of retractors each including one of said tubular sheaths extending between said retractor units and said control station and a pair of said flexible cables slideably extending through said sheaths, one of the ends of each of said cables being drive coupled to said drive member and the other ends of said cables being drive coupled to pawl members of respective retractor units.

5. The mechanism of claim 2 wherein said sensing member includes a pendulum swingable between a de-actuated plumb position and an inclined actuated position and said drive member is moved by said pendulum between its retracted and advanced position with the actuation and deactuation of said pendulum.

6. The mechanism of claim 5 wherein the pendulum is universally swingable.

7. The mechanism of claim 5 comprising an upwardly directed circular wall defining a circular fulcrum, a cap member mounted atop said pendulum and including a top wall resting on said fulcrum and a depending skirt wall surrounding said circular wall, said drive member comprising a vertically slideable follower member urged into engagement with said cap member and means including a lever coupling said cable to said lever whereby movement of said pendulum is transmitted to said cable by way of said follower member and said lever.

8. A wire-actuated electro-magnetic emergency locking and winding apparatus used with vehicle safety belts, comprising a winding unit mounted to the vehicle floor or other portions, an electro-magnetic unit provided to the vehicle side wall, and wires introduced through the tubes connecting said winding and electro-magnetic units, a solenoid being provided near the electro-magnetic unit mounting plate for pushing the wires outwardly by plunger operation, and pawl plate engageable with two ratchet teeth of the winding unit and constituting a lock mechanism, said pawl plate coming in operation solely by the pressure applied by the wires, said winding unit being characterized in that, in case of the extraordinary situations such as collision of the automotive vehicles, said solenoid of the electro-magnetic unit is turned on through the acceleration sensor for actuating said plunger and causing the displacement of the wires, whereby the pawl plate for each winding unit meshes with the ratchet and for performing a locking operation.

9. An emergency locking winding unit driven by wire for use with safety belts, equipped on the automotive vehicles and the like, comprising winding means mounted to the vehicle floor, an acceleration sensor (hereafter mentioned as sensor) mounted to some other portion of the vehicle floor, and a wire introduced through a tube connecting the winding unit and the sensor, said sensor being formed by a pendulum, a bonnet-shaped displacement member place above the pendulum, a cylindrical saucer, and a bonnet-shaped slide plate placed above the displacement member, the deflection of the pendulum being converted through said slide plate and said wire from an L-shaped lever and said slide plate into a left and right movement of the wire for pulling it, and said winding means having a locking mechanism formed by two ratchet teeth provided to the winding means, and a pawl plate engageable with said ratchet teeth, and a locking mechanism adapted for actuating the pawl plate under the traction and pressure exerted by said wire; the winding unit so operating that the acceleration applied to the pendulum at the time of collision or other extraordinary situations of the vehicle is sensed and the pawl plate engages the ratchet teeth through said wire for performing a locking operation.

* * * * *